(12) United States Patent
Steinmetz et al.

(10) Patent No.: US 7,732,528 B2
(45) Date of Patent: *Jun. 8, 2010

(54) WATER-ABSORBENT CROSSLINKED POLYMERS

(75) Inventors: Bernhard Steinmetz, Rütschenhausen (DE); Peter W. Carrico, West Point, MS (US); Vernon Adey, Hamilton, MS (US)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/815,791

(22) PCT Filed: Mar. 3, 2006

(86) PCT No.: PCT/EP2006/060414

§ 371 (c)(1),
(2), (4) Date: Aug. 8, 2007

(87) PCT Pub. No.: WO2006/094932

PCT Pub. Date: Sep. 14, 2006

(65) Prior Publication Data

US 2008/0146735 A1    Jun. 19, 2008

Related U.S. Application Data

(60) Provisional application No. 60/658,895, filed on Mar. 3, 2005.

(51) Int. Cl.
*C08F 220/00* (2006.01)
*C08F 220/06* (2006.01)
*C08F 8/44* (2006.01)

(52) U.S. Cl. .................. 525/78; 525/329.7; 526/240

(58) Field of Classification Search ............... 525/78; 526/240

See application file for complete search history.

(56) References Cited

U.S. PATENT DOCUMENTS

| 6,605,673 B1 | 8/2003 | Mertens et al. |
| 2004/0176557 A1 | 9/2004 | Mertens et al. |

FOREIGN PATENT DOCUMENTS

| WO | WO 00/53644 | 9/2000 |
| WO | WO-02/20068 | 3/2002 |
| WO | WO-2004/096127 | 11/2004 |

OTHER PUBLICATIONS

International Search Report in PCT/EP2006/060414 dated May 12, 2006.

*Primary Examiner*—Jeffrey C Mullis
(74) *Attorney, Agent, or Firm*—Marshall, Gerstein & Borun LLP

(57) ABSTRACT

Water-absorbent crosslinked polymers bearing acid groups, some or all of the acid groups being present as carboxylate groups having at least two different types of cations as counterions, processes for their preparation and mixtures of water-absorbent crosslinked polymers.

15 Claims, No Drawings

WATER-ABSORBENT CROSSLINKED POLYMERS

CROSS-REFERENCE TO RELATED APPLICATIONS

This is the U.S. national phase application of International Application No. PCT/EP2006/060414, filed Mar. 3, 2006, which claims the benefit of U.S. provisional patent application No. 60/658,895, filed Mar. 3, 2005.

The present invention concerns water-absorbent crosslinked polymers bearing acid groups, some or all of the acid groups being present as carboxylate groups having at least two different types of cations as counterions, processes for their preparation and mixtures of water-absorbent crosslinked polymers.

Water-absorbent polymers are in particular polymers of (co)polymerized hydrophilic monomers, graft copolymers of one or more hydrophilic monomers on a suitable grafting base, crosslinked cellulose ethers, crosslinked starch ethers, crosslinked carboxymethylcellulose, partially crosslinked polyalkylene oxide or natural products which are swellable in aqueous fluids, such as guar derivatives for example. Such polymers are used as products capable of absorbing aqueous solutions to manufacture diapers, tampons, sanitary napkins and other hygiene articles, but also as water retainers in market gardening.

Water-absorbent polymers are polymers having a centrifuge retention capacity (CRC) of preferably above 15 g/g, especially above 20 g/g, more preferably above 25 g/g, especially above 30 g/g, even more preferably above 35 g/g.

To improve performance properties, for example diaper rewet and absorbency under load, water-absorbent polymers are generally surface or gel postcrosslinked. This postcrosslinking is preferably carried out in the aqueous gel phase or as surface postcrosslinking of the ground and classified polymeric particles.

It is an object of the present invention to provide water-absorbent crosslinked polymers with an improved absorption performance, for example with an improved centrifuge retention capacity (CRC) or an improved free swell capacity (FSC).

The present invention further has for its object to provide a process for preparing the water-absorbent crosslinked polymers.

We have found that this object is achieved by providing water-absorbent crosslinked polymers comprising a) at least one copolymerized ethylenically unsaturated monomer bearing acid groups, some or all of the acid groups being present as carboxylate groups having at least two different types of metallic monovalent cations as counterions,
b) at least one copolymerized crosslinker,
c) if appropriate one or more copolymerized ethylenically and/or allylically unsaturated monomers copolymerizable with a) and
d) if appropriate one or more water-soluble polymers onto which the monomers a), b) and if appropriate c) are at least partly grafted, wherein said cations are homogeneous distributed in said crosslinked polymer.

In a preferred embodiment the molar ratio of each type of cation is at least 5 mol %, preferably at least 10 mol %, more preferably at least 15 mol %, even more preferably at least 20 mol % and yet even more preferably at least 25 mol %, based on the counterions of the carboxylate groups.

Preferred counterions are potassium, sodium and lithium cations. More preferred counterions are potassium and sodium cations.

If potassium and sodium cations are used as counterions, the molar ratio of potassium is typically at least 10 mol %, preferably at least 20 mol %, more preferably at least 30 mol %, even more preferably at least 40 mol % and yet even more preferably at least 50 mol %, based on the potassium and sodium cations.

Examples for ethylenically unsaturated monomers bearing acid groups are acrylic acid, methacrylic acid, vinylsulfonic acid, vinylphosphonic acid, maleic acid, maleic anhydride, fumaric acid, itaconic acid, 2-acrylamido-2-methylpropanesulfonic acid and 2-acrylamido-2-methylpropanephosphonic acid. Preferred ethylenically unsaturated monomers are acrylic acid, methacrylic acid and mixtures thereof.

Typically, the acid groups of the copolymerized ethylenically unsaturated monomers are neutralized to an extent in the range from 25 to 100 mol %, preferably to an extent in the range from 40 to 90 mol %, more preferably to an extent in the range from 50 to 85 mol % and even more preferably to an extent in the range from 55 to 80 mol %.

The water content of the polymer is typically in the range from 0% to 20% by weight, preferably in the range from 0% to 10% by weight, more preferably in the range from 0% to 5% by weight and most preferably in the range from 1% to 3% by weight.

In a preferred embodiment, the water-absorbent crosslinked polymers according to the present invention are surface postcrosslinked particles.

The water-absorbent crosslinked polymers of the present invention can be prepared by various methods.

For instance, it is possible for a mixture of a) at least one ethylenically unsaturated monomer bearing acid groups,
b) at least one crosslinker,
c) if appropriate one or more ethylenically and/or allylically unsaturated monomer copolymerizable with a) and
d) if appropriate one or more water-soluble polymers which can serve as grafting base for the monomers a), b) and if appropriate c), to be free-radically polymerized as an aqueous solution in the presence of an initiator to form a hydrogel A and for the acid groups in the hydrogel A e) to be neutralized at least partly, typically to an extent in the range from 25 to 100 mol-%, preferably to an extent in the range from 40 to 90 mol-%, more preferably to an extent in the range from 50 to 85 mol-% and even more preferably to an extent in the range from 55 to 80 mol-% with bases corresponding to at least two different types of cations.

It is possible, for example, for an aqueous solution of acrylic acid having a small fraction of crosslinker to be polymerized. The resulting aqueous gel is subsequently mixed with potassium carbonate and sodium hydroxide, some of the carboxyl units being neutralized to the corresponding carboxylates. The polymerized gel is initially comminuted, subsequently dried to form a coarse, dry material and further processed by grinding and sieving to form a flowable, finely granular powder.

However, it is also possible for a mixture of a) at least one ethylenically unsaturated monomer bearing acid groups, some or all of the acid groups, typically from 25 to 100 mol %, preferably from 40 to 90 mol %, more preferably from 50 to 85 mol % and most preferably from 55 to 80 mol % of the acid groups being neutralized with bases corresponding to at least two different types of cations, b) at least one crosslinker,
c) if appropriate one or more ethylenically and/or allylically unsaturated monomers copolymerizable with a) and
d) if appropriate one or more water-soluble polymers which can serve as grafting base for the monomers a), b) and if appropriate c), to be free-radically polymerized as an aqueous solution in the presence of an initiator.

For example, it is possible for an aqueous solution of acrylic acid to be partly neutralized with potassium carbonate and sodium hydroxide and subsequently admixed with a small fraction of crosslinker. This solution is then polymerized. The polymerized aqueous gel is initially comminuted, subsequently dried to form a coarse, dry material and further processed by grinding and sieving to form a flowable, finely granular powder.

It is further possible for a mixture of
a) at least one ethylenically unsaturated monomer bearing acid groups, some or all of the acid groups, typically from 5 to 80 mol %, preferably from 10 to 70 mol %, more preferably from 20 to 60 mol % and most preferably from 30 to 50 mol % of the acid groups being neutralized with one or more bases corresponding to at least one type of cation,
b) at least one crosslinker,
c) if appropriate one or more ethylenically and/or allylically unsaturated monomers copolymerizable with a) and
d) if appropriate one or more water-soluble polymers which can serve as grafting base for the monomers a), b) and if appropriate c), to be free-radically polymerized as an aqueous solution in the presence of an initiator,
e) postneutralized, typically to an extent in the range from 25 to 100 mol %, preferably to an extent in the range from 40 to 90 mol %, more preferably to an extent in the range from 50 to 85 mol % and even more preferably to an extent in the range from 55 to 80 mol % with one or more bases corresponding to at least one type of cation.

For example, it is possible for an aqueous solution of acrylic acid to be partly neutralized with sodium hydroxide and subsequently admixed with a small fraction of crosslinker. This solution is then polymerized. The resulting aqueous gel is subsequently postneutralized by mixing with potassium carbonate. The polymerized gel is initially comminuted, subsequently dried to form a coarse, dry material and further processed by grinding and sieving to form a flowable, finely granular powder.

Typically, the hydrogel A is then dried, comminuted, classified and surface postcrosslinked.

Hydrophilic monomers useful for preparing these water-absorbent crosslinked polymers include for example acids which are capable of addition polymerization, such as acrylic acid, methacrylic acid, vinylsulfonic acid, vinylphosphonic acid, maleic acid, maleic anhydride, fumaric acid, itaconic acid, 2-acrylamido-2-methylpropanesulfonic acid, 2-acrylamido-2-methylpropanephosphonic acid and also their amides, hydroxyalkyl esters and amino- or ammonio-containing esters and amides. It is further possible to use water-soluble N-vinylamides such as N-vinylformamide or else diallyldimethylammonium chloride. Preferred hydrophilic monomers are compounds of the general formula I

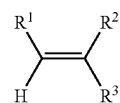

where
$R^1$ is hydrogen, methyl, ethyl or carboxyl,
$R^2$ is —$COOR^4$, hydroxysulfonyl or phosphonyl, a phosphonyl group esterified with a $C_1$-$C_4$-alkanol, or a group of the formula II

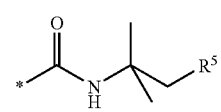

$R^3$ is hydrogen, methyl or ethyl,
$R^4$ is hydrogen, $C_1$-$C_4$-aminoalkyl, $C_1$-$C_4$-hydroxyalkyl, and
$R^5$ is a sulfonyl group, a phosphonyl group or a carboxyl group.

Examples of $C_1$-$C_4$-alkanols are methanol, ethanol, n-propanol, isopropanol or n-butanol. Examples of $C_1$-$C_4$-aminoalkyl are aminomethyl, aminoethyl or amino-n-propyl.

Particularly preferred hydrophilic monomers are acrylic acid and methacrylic acid.

Suitable grafting bases for water-absorbent crosslinked polymers which are obtainable by graft copolymerization of olefinically unsaturated acids can be of natural or synthetic origin. Examples are starch, cellulose or cellulose derivatives and also other polysaccharides and oligosaccharides, polyalkylene oxides, especially polyethylene oxides and polypropylene oxides, and also hydrophilic polyesters.

Suitable polyalkylene oxides have for example the formula III

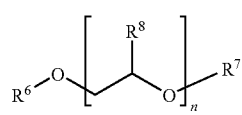

where
$R^6$, $R^7$ are independently hydrogen, alkyl, alkenyl or aryl,
$R^8$ is hydrogen or methyl, and
n is an integer from 1 to 10 000.
$R^6$ and $R^7$ are each preferably hydrogen, $C_1$-$C_4$-alkyl, $C_2$-$C_6$-alkenyl or phenyl.

Preferred polymers are in particular polyacrylates, polymethacrylates and also the U.S. Pat. Nos. 4,931,497, 5,011,892 and 5,041,496 graft polymers.

The water-absorbent crosslinked polymers comprise compounds having at least two double bonds which have been polymerized into the polymeric network. Suitable crosslinkers are in particular N,N'-methylenebisacrylamide and N,N'-methylenebismethacrylamide, esters of unsaturated mono- or polycarboxylic acids of polyols, such as diacrylate or triacrylate, for example butanediol or ethylene glycol diacrylate or methacrylate and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427. The process of the present invention can further utilize hydrogels which are prepared using polyallyl ethers as a crosslinker and by acidic homopolymerization of acrylic acid. Suitable crosslinkers are pentaerythritol triallyl and tetraallyl ethers, polyethylene glycol diallyl ether, ethylene glycol diallyl ether, glycerol diallyl ether, glycerol triallyl ether, polyallyl ethers based on sorbitol, and also ethoxylated variants thereof.

The preferred methods of making the swellable crosslinked polymer which can be used in the process of the present invention are described in "Modern Superabsorbent Polymer Technology", F. L. Buchholz and A. T. Graham, Wiley-VCH, 1998, pages 77 to 84. Particular preference is given to polymers which are prepared in a kneader, as described for example in WO-A-01/38402, or on a belt reactor, as described for example in EP-A-0 955 086.

The water-absorbent crosslinked polymer is preferably a polymeric acrylic acid or a polyacrylate. This water-absorbent crosslinked polymer can be prepared by a process known from the literature. Preference is given to polymers which comprise crosslinking comonomers in amounts from 0.001 to 10 mol % and preferably 0.01 to 1 mol %, but very particular preference is given to polymers which were obtained by free-radical polymerization and where a polyfunctional ethylenically unsaturated free-radical crosslinker was used which additionally bears at least one free hydroxyl group (such as for example pentaerythritol triallyl ether or trimethylolpropane diallyl ether).

The water-absorbent crosslinked polymers are preparable by addition polymerization processes known per se. Preference is given to addition polymerization in aqueous solution conducted as a gel polymerization. It involves for example 15% to 50% by weight aqueous solutions of one or more hydrophilic monomers and if appropriate of a suitable grafting base being addition polymerized in the presence of a free-radical initiator by utilizing the Trommsdorff-Norrish effect (Makromol. Chem. 1, 169 (1947)), preferably without mechanical mixing. The addition polymerization reaction may be carried out in the temperature range between 0 and 150° C. and preferably between 10 and 100° C., not only at atmospheric pressure but also at superatmospheric or reduced pressure. As usual, the polymerization can also be carried out in a protective gas atmosphere, preferably under nitrogen or steam. The addition polymerization may be induced using high-energy electromagnetic rays or the customary chemical addition polymerization initiators, for example organic peroxides, such as benzoyl peroxide, tert-butyl hydroperoxide, methyl ethyl ketone peroxide, cumene hydroperoxide, azo compounds such as azodiisobutyronitrile and also inorganic peroxo compounds such as $(NH_4)_2S_2O_8$ or $K_2S_2O_8$ or $H_2O_2$. They may be used if appropriate in combination with reducing agents such as sodium hydrogensulfite and iron(II) sulfate or redox systems, where the reducing component included is an aliphatic or aromatic sulfinic acid, such as benzenesulfinic acid and toluenesulfinic acid or derivatives of these acids, such as Mannich adducts of sulfinic acids, aldehydes and amino compounds, as described in DE-A-13 01 566. The performance characteristics of the polymers can be further improved by postheating the polymer gels in the temperature range from 50 to 130° C. and preferably from 70 to 100° C. for several hours.

Neutralization can be carried out at the monomer solution stage and/or at the gel stage. To this end, either the polymeric gel prepared from an unneutralized monomer solution is neutralized or the monomer solution is neutralized and subsequently polymerized to form the polymeric gel or the monomer solution is partially neutralized and subsequently the polymeric gel obtained by polymerization is postneutralized.

The gels obtained are neutralized for example to an extent in the range from 25 to 100 mol %, preferably to an extent in the range from 40 to 90 mol %, more preferably to an extent in the range from 50 to 85 mol % and most preferably to an extent in the range from 55 to 80 mol %, based on monomer bearing acid groups which is used, for which alkali metal hydroxide, an alkali metal bicarbonate, an alkali metal carbonate, an alkali metal oxide, an alkaline earth metal hydroxide, an alkaline earth metal bicarbonate, an alkaline earth metal carbonate, an alkaline earth metal oxide or mixtures thereof can be used, preferably alkali metal hydroxides or alkali metal oxides, more preferably, however, sodium hydroxide, potassium hydroxide, sodium carbonate, potassium carbonate, sodium bicarbonate and potassium bicarbonate.

Typically, the gel is neutralized/postneutralized by admixing the neutralizing agent as an aqueous solution or else preferably as a solid. For this, the gel is mechanically comminuted, for example by means of a meat grinder, and the neutralizing agent is sprayed on, scattered on or poured on and then carefully mixed in. To this end, the gel mass obtained can be repeatedly passed through a meat grinder for homogenization. The neutralized gel mass is then dried with a belt or drum dryer for example until the residual moisture content is preferably below 5% by weight, more preferably below 3% by weight and especially below 1% by weight. The dried hydrogel is subsequently ground and sieved, useful grinding apparatus typically including roll mills, pin mills or swing mills. The particle size of the sieved hydrogel is preferably in the range from 1 to 1000 µm, more preferably in the range from 45 to 850 µm, even more preferably in the range from 100 to 800 µm and yet even more preferably in the range from 100 to 700 µm.

Powders having particle sizes in the range from 1 to 50 µm for example are preferably desensitized, i.e., by addition of a suitable inert compound, so that the fraction of particles of less than 10 µm is by agglomeration reduced by at least 90%, preferably at least 95% and more preferably at least 99%, or by dispersion in a suitable inert solvent. Suitable inert compounds or solvents exhibit reduced swellability. Centrifuge retention capacity (CRC) in the inert compounds or solvents is less than 1 g/g, preferably less than 0.5 g/g and more preferably less than 0.1 g/g.

The water-absorbent crosslinked polymers may be postcrosslinked in the region of the particle surface to improve performance characteristics. Postcrosslinking is described for example in "Modern Superabsorbent Polymer Technology", F. L. Buchholz and A. T. Graham, Wiley-VCH, 1998, pages 55 to 60. Postcrosslinking is generally carried out by spraying a solution of the surface postcrosslinker onto the dry base polymeric powder. After spraying, the polymeric powder is thermally dried, and the crosslinking reaction can take place not only before but also during drying.

The spraying with a solution of the crosslinker is preferably carried out in reaction mixers or mixing and drying ranges, such as for example Lödige® mixers, BEPEX® mixers, NAUTA® mixers, SCHUGI® mixers, NARA® dryers and PROCESSALL®. Fluidized bed dryers can be used as well in addition.

Drying may take place in the mixer itself, by heating the jacket or introducing a stream of warm air. It is similarly possible to use a downstream dryer, such as for example a tray dryer, a rotary tube oven or a heatable screw. But it is also possible for example to utilize an azeotropic distillation as a drying process.

Preferred drying temperatures are in the range from 50 to 250° C., preferably in the range from 60 to 200° C. and more preferably in the range from 70 to 180° C. The preferred residence time at this temperature in the reaction mixer or dryer is below 60 minutes, preferably below 30 minutes and more preferably below 10 minutes.

The surface postcrosslinkers can be used alone or combined with other surface postcrosslinkers, for example ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, glycerol diglycidyl ether, polyglycerol diglycidyl ether, epichlorohydrin, ethylenediamine, ethylene glycol, diethylene glycol, triethylene glycol, polyethylene glycol, propylene glycol, dipropylene glycol, tripropylene glycol, polypropylene glycol, butylene glycol, 1,3-propanediol, 1,4-butanediol, bisphenol A, glycerol, trimethylolpropane, pentaerythritol, sorbitol, diethanolamine, triethanolamine, ethylenediamine, ethylene carbonate, propylene carbonate, 2-oxazolidones, such as 2-oxazolidinone or N-hydroxyethyl-2-oxazolidinone, 2,3-morpholinediones, such as N-2-hydroxyethyl-2,3-morpholinedione, N-methyl-2,3-morpholinedione, N-ethyl-2,3-morpholinedione and/or N-tert-butyl-2,3-morpholinedione, 2-oxotetrahydro-1,3-oxazine, N-acyl-2-oxazolidones, such as N-acetyl-2-oxazolidone, bicyclic amide acetals, such as 5-methyl-1-aza-4,6-dioxabicyclo[3.3.0]octane, 1-aza-4,6-dioxabicyclo[3.3.0]octane and/or 5-isopropyl-1-aza-4,6-dioxabicyclo[3.3.0]octane, and/or bis- and poly-2-oxazolidinones.

The surface postcrosslinker is preferably dissolved in solvents which are not self-reactive, preferably in lower alcohols, such as for example methanol, ethanol, isopropanol, propylene glycol, ethylene glycol, preferably isopropanol, most preferably in aqueous solutions of such suitable alcohols, in which case the alcohol content of the solution is in the range from 10% to 90% by weight, more preferably between 25% to 70% by weight and especially between 30% to 50% by weight.

The surface postcrosslinker is used in an amount from 0.01% to 1% by weight, based on the polymer used, and the crosslinker solution itself is used in an amount from 1% to 20% by weight and preferably from 3% to 15% by weight, based on the polymer used.

Preferred postcrosslinkers are 2-oxazolidones, such as 2-oxazolidinone or N-hydroxyethyl-2-oxazolidinone, N-acyl-2-oxazolidones, such as N-acetyl-2-oxazolidone, 2-oxotetrahydro-1,3-oxazine, bicyclic amide acetals, such as 5-methyl-1-aza-4,6-dioxabicyclo[3.3.0]octane, 1-aza-4,6-dioxabicyclo[3.3.0]octane and/or 5-isopropyl-1-aza-4,6-dioxabicyclo[3.3.0]octane, bis-2-oxazolidones and/or poly-2-oxazolidones.

Particularly preferred postcrosslinkers are 2-oxazolidinone, N-hydroxyethyl-2-oxazolidinone or ethylene glycol diglycidyl ether.

The present invention further provides for mixtures of water-absorbent crosslinked polymers comprising at least two water-absorbent crosslinked polymers comprising a) at least one copolymerized ethylenically unsaturated monomer bearing acid groups, some or all of the acid groups being present as carboxylate groups having one or more type of cations as counterions, b) at least one copolymerized crosslinker, c) if appropriate one or more copolymerized ethylenically and/or allylically unsaturated monomers copolymerizable with a) and d) if appropriate one or more water-soluble polymers onto which the monomers a), b) and if appropriate c) are at least partly grafted, wherein said mixture contains at least two of said polymers having different types of cations as said counterions.

In a preferred embodiment the molar ratio of each type of cation is at least 5 mol %, preferably at least 10 mol %, more preferably at least 15 mol %, even more preferably at least 20 mol % and yet even more preferably at least 25 mol %, based on the counterions of the carboxylate groups.

Preferred counterions are potassium, sodium and lithium cations. More preferred counterions are potassium and sodium cations.

If potassium and sodium cations are used as counterions, the molar ratio of potassium is typically at least 10 mol %, preferably at least 20 mol %, more preferably at least 30 mol %, even more preferably at least 40 mol % and yet even more preferably at least 50 mol %, based on the potassium and sodium cations.

Examples for ethylenically unsaturated monomers bearing acid groups are acrylic acid, methacrylic acid, vinylsulfonic acid, vinylphosphonic acid, maleic acid, maleic anhydride, fumaric acid, itaconic acid, 2-acrylamido-2-methylpropanesulfonic acid and 2-acrylamido-2-methylpropanephosphonic acid. Preferred ethylenically unsaturated monomers are acrylic acid, methacrylic acid and mixtures thereof.

Typically, the acid groups of the copolymerized ethylenically unsaturated monomers are neutralized to an extent in the range from 25 to 100 mol %, preferably to an extent in the range from 40 to 90 mol %, more preferably to an extent in the range from 50 to 85 mol % and even more preferably to an extent in the range from 55 to 80 mol %.

The water content of the mixture is typically in the range from 0% to 20% by weight, preferably in the range from 0% to 10% by weight, more preferably in the range from 0% to 5% by weight and most preferably in the range from 0% to 1% by weight.

The mixtures of water-absorbent crosslinked polymers of the present invention can be prepared by mixing of at least two water-absorbent crosslinked polymers.

The mixtures of at least two water-absorbent crosslinked polymers according to the present invention are not subject to any restrictions. Examples for such mixtures are mixtures of at least two hydrogels before drying, mixtures of at least two dried hydrogels before surface-crosslinking, mixtures of at least two surface-crosslinked water-absorbent polymers, mixtures of at least one hydrogel before drying and at least one dried hydrogel before surface-crosslinking, mixtures of at least one hydrogel before drying and at least one surface-crosslinked water-absorbent polymer and mixtures of at least one dried hydrogel before surface-crosslinking and at least one surface-crosslinked water-absorbent polymer.

The type of mixing is not subject to any restrictions. It is thus possible to use for example reaction mixers or mixing and drying ranges, such as for example Lödige® mixers, BEPEX® mixers, NAUTA® mixers, SCHUGI® mixers, Nara® dryers and PROCESSALL®.

The simultaneous use of at least two different types of cations, in a water-absorbent crosslinked polymers or in a polymeric mixtures, induces a synergistic effect; that is, the absorption capacity is higher than on using water-absorbent crosslinked polymers comprising one type of cation only.

The water-absorbent crosslinked polymers are useful for use as absorbent in articles like sanitary goods, paper diapers, disposable diapers and similar hygienic goods, agricultural or horticultural water-retaining agents, industrial dehydrating agents, sludge coagulants, thickening agents, condensation preventing agents for building materials, release control agents for chemicals and various other applications. Hygienic articles are preferred.

To determine the quality of the present invention's water-absorbent crosslinked polymers, the dried polymer is tested using test methods described hereinbelow:

Test Methods

A) Centrifuge Retention Capacity (CRC)

The centrifuge retention capacity is determined according to the test method no. 441.2-02 recommended by the EDANA (European Disposables and Nonwovens Association).

B) Free Swell Capacity (FSC)

The free swell capacity is determined according to the test method no. 440.2-02 recommended by the EDANA (European Disposables and Nonwovens Association).

C) Residual Monomers

The residuals monomers are determined according to the test method no. 410.2-02 recommended by the EDANA (European Disposables and Nonwovens Association).

D) Extractables

The extractables are determined according to the test method no. 470.2-02 recommended by the EDANA (European Disposables and Nonwovens Association).

The EDANA test methods are available under www.edana.org or at the European Disposables and Nonwovens Association, Avenue Eugene Plasky 157, B-1030 Bruxelles, Belgium.

EXAMPLES

Examples 1 to 12

A mixture of 50.92 kg water and 57.38 kg acrylic acid was neutralized with 24.48 kg sodium carbonate. After the neutralization, 13.92 g ethoxylated (15 EO) trimethylolpropane triacrylate (Sartomer® SR 9035, from Sartomer) were added (monomer solution A).

A mixture of 50.92 kg water and 57.38 kg acrylic acid was neutralized with 31.91 kg potassium carbonate After the neutralization, 13.92 g ethoxylated (15 EO) trimethylolpropane triacrylate (Sartomer® SR 9035, from Sartomer) were added (monomer solution B).

The monomer solutions were preheated to 46° C. prior to combination. After 3.33 kg of the monomer solutions, at the ratios designated in the following table, were thoroughly mixed, 31.5 g of 5 wt % aqueous sodium persulfate and 25.0 g of 15 wt % aqueous 2,2'-azobis-(2-amidinopropane)-dihydrochloride were added and thoroughly blended. The mixture was then poured into the polymerization vessel and initiated with 4 to 5 drops of 40 wt % aqueous sodium metabisulfite placed in one corner of the reaction vessel at the surface of the monomer mixture. The polymerization was allowed to complete in a thermally insulated open-topped vessel under a laboratory-type hood for vapor containment.

Once the polymerizations were complete, the formed slabs were torn into small chunks and allowed to dry overnight in a box oven, set at a temperature not greater than 50° C. After drying, the samples were milled and sized to a particle size of 180 to 710 µm.

The measured values obtained with the samples are listed in the following table.

TABLE 1

Test results

| Example | Solution A | Solution B | CRC [g/g] | FSC [g/g] | Residual monomers | Extractables |
|---|---|---|---|---|---|---|
| 1 | 100% | | 40.5 | 32.3 | 364 ppm | 45.7 wt. % |
| 2 | | 100% | 40.7 | 35.6 | 236 ppm | 31.1 wt. % |
| 3 | 95% | 5% | 42.7 | 36.5 | 305 ppm | 40.9 wt. % |
| 4 | 90% | 10% | 45.8 | 35.4 | 297 ppm | 37.9 wt. % |
| 5 | 85% | 15% | 42.7 | 35.0 | 347 ppm | 41.6 wt. % |
| 6 | 80% | 20% | 47.0 | 34.2 | 268 ppm | 38.8 wt. % |
| 7 | 75% | 25% | 41.7 | 37.3 | 252 ppm | 38.1 wt. % |
| 8 | 70% | 30% | 45.2 | 38.8 | 328 ppm | 38.4 wt. % |
| 9 | 65% | 35% | 43.7 | 39.2 | 238 ppm | 36.6 wt. % |
| 10 | 60% | 40% | 45.8 | 36.7 | 244 ppm | 37.6 wt. % |
| 11 | 55% | 45% | 40.9 | 37.4 | 257 ppm | 34.9 wt. % |
| 12 | 50% | 50% | 44.7 | 42.1 | 234 ppm | 37.6 wt. % |

The invention claimed is:

1. A water-absorbent crosslinked polymer particle comprising
    a) at least one copolymerized ethylenically unsaturated monomer bearing acid groups, some or all of the acid groups being present as carboxylate groups having at least two different types of metallic monovalent cations as counterions,
    b) at least one copolymerized crosslinker,
    c) optionally one or more copolymerized ethylenically and/or allylically unsaturated monomer copolymerizable with a) and
    d) optionally one or more water-soluble polymer onto which the monomers a), b), and optional c) are at least partly grafted, wherein said cations are homogenously distributed in said dry crosslinked polymer particle and the acid groups of the copolymerized ethylenically unsaturated monomers are neutralized to an extent in the range from 40 to 90 mol %,
    and wherein the water-absorbent crosslinked particles comprise 0% to 20%, by weight, water.

2. The polymer particle according to claim 1 wherein the molar ratio of each type of cation is at least 5 mol %.

3. The polymer particle according to claim 1 wherein some or all of the carboxylate groups of the copolymerized monomer a) have potassium and sodium cations as counterions.

4. The polymer particle according to claim 1 wherein the monomer a) is acrylic acid, methacrylic acid, or a mixture thereof.

5. The polymer particle according to claim 1 wherein the degree of neutralisation of monomer a) is from 55 to 85 mol %.

6. A process for preparing a water-absorbent crosslinked polymer particle according to claim 1, wherein a mixture of
    a) at least one ethylenically unsaturated monomer bearing acid groups which may be partly neutralized,
    b) at least one crosslinker,
    c) optionally one or more ethylenically and/or allylically unsaturated monomer copolymerizable with a) and
    d) optionally one or more water-soluble polymer which can serve as grafting base for the monomers a), b), and optional c), is free-radically polymerized as an aqueous solution in the presence of an initiator to form a hydrogel A, and the remaining acid groups in the hydrogel A optionally are partly postneutralized.

7. A mixture of water-absorbent crosslinked polymers comprising at least two water-swellable crosslinked polymers comprising
- a) at least one copolymerized ethylenically unsaturated monomer bearing acid groups, some or all of the acid groups being present as carboxylate groups having one or more types of metallic monovalent cations as counterions,
- b) at least one copolymerized crosslinker,
- c) optionally one or more copolymerized ethylenically and/or allylically unsaturated monomer copolymerizable with a) and
- d) optionally one or more water-soluble polymer onto which the monomers a), b), and optional c) are at least partly grafted,
- wherein said mixture contains a homogenous distribution of at least two of said polymers having different types of metallic monovalent cations as said counterions,
- wherein the water-swellable crosslinked polymers comprise 0% to 20%, by weight, water.

8. The mixture according to claim 7 wherein some or all of the carboxylate groups of the copolymerized monomer a) have potassium and sodium cations as counterions.

9. The mixture according to claim 7 wherein the molar ratio of each type of cation is at least 5 mol %.

10. The mixture according to claim 7 wherein the monomer a) is acrylic acid, methacrylic acid, or a mixture thereof.

11. The mixture according to claim 7 wherein the degree of neutralisation of monomer a) is from 25 to 100 mol %.

12. An article comprising polymer particles of claim 1.

13. An article comprising the mixture of polymers of claim 7.

14. The polymer particle according to claim 1 wherein a molar ratio of each type of cation is at least 25%, based on the counterions of the carboxylic group.

15. The mixture according to claim 7 wherein a molar ratio of each type of cation is at least 25%, based on the counterions of the carboxylic group.

* * * * *